US012320479B1

(12) United States Patent
Liang et al.

(10) Patent No.: US 12,320,479 B1
(45) Date of Patent: Jun. 3, 2025

(54) OPTICAL WATER CURTAIN SYSTEM ADAPTIVE TO WATER SPEED

(71) Applicant: Guangzhou Rising Dragon Recreation Industrial Co., Ltd., Guangzhou (CN)

(72) Inventors: Bo Liang, Guangzhou (CN); Ziqin Guo, Guangzhou (CN); Huaibin Zhao, Guangzhou (CN)

(73) Assignee: Guangzhou Rising Dragon Recreation Industrial Co., Ltd., Guangzhou (CN)

( * ) Notice: Subject to any disclaimer, the term of this patent is extended or adjusted under 35 U.S.C. 154(b) by 0 days.

(21) Appl. No.: 18/896,959

(22) Filed: Sep. 26, 2024

(30) Foreign Application Priority Data

May 27, 2024 (CN) ......................... 202421168772.1

(51) Int. Cl.
*F21S 10/00* (2006.01)
*F21V 3/06* (2018.01)
*F21Y 115/10* (2016.01)

(52) U.S. Cl.
CPC ............ *F21S 10/002* (2013.01); *F21V 3/063* (2018.02); *F21Y 2115/10* (2016.08)

(58) Field of Classification Search
CPC ............................... F21V 3/063; F21S 10/002
See application file for complete search history.

(56) References Cited

U.S. PATENT DOCUMENTS 4,920,465 A * 4/1990 Sargent ................... F21S 9/046 239/18
6,170,094 B1 * 1/2001 Weise ....................... E04H 4/14 4/678
6,752,517 B2 * 6/2004 Hildebrand ........... F21V 33/004 362/240
7,784,959 B2 * 8/2010 Yang ..................... F21S 10/002 362/101
10,221,583 B1 * 3/2019 Elder .................... F21V 31/005
10,315,214 B2 * 6/2019 Vogtner .................... F21S 8/00
11,383,979 B1 * 7/2022 Lynn ................... B01F 23/2323
11,400,478 B2 * 8/2022 Huang .................. B05B 17/085
11,602,032 B2 * 3/2023 Miller ...................... B05B 1/185
2010/0277087 A1 * 11/2010 Ikeda ................... A61B 1/0669 315/250
2011/0164405 A1 * 7/2011 Boonekamp ............ G09F 13/24 362/101
2017/0218648 A1 * 8/2017 Hsu ....................... B05B 1/1636
2018/0147595 A1 * 5/2018 Vogtner .................. E04H 4/148
(Continued)

*Primary Examiner* — Gerald J Sufleta, II
(74) *Attorney, Agent, or Firm* — Frank Niranjan

(57) ABSTRACT

An optical water curtain system includes a water supply portion, at least one water collecting portion, a physical rotor, a control module, and an LED light-emitting module and a rotation speed detecting module. The water supply portion is in fluid communication with the water collecting portion, and the water collecting portion has outlets through which water flows down to form a water curtain. The LED light-emitting module emits light to illuminate the water curtain. The physical rotor is located within the water curtain and rotatable under an impulse of a water flow from the water curtain. The rotation speed detecting module detects a rotation speed of the physical rotor and send data to the control module. The control module adjusts a frequency of a PWM signal driving the LED light-emitting module to switch a light-emitting effect of the LED light-emitting module according to the rotation speed of the physical rotor.

7 Claims, 2 Drawing Sheets

(56) References Cited

U.S. PATENT DOCUMENTS

| | | | | |
|---|---|---|---|---|
| 2020/0039044 | A1* | 2/2020 | Akiba | B25C 1/06 |
| 2020/0086336 | A1* | 3/2020 | Rosko | B05B 1/26 |
| 2021/0146396 | A1* | 5/2021 | Weir | B05B 17/08 |
| 2023/0363603 | A1* | 11/2023 | Lee | A47L 9/2842 |
| 2024/0139930 | A1* | 5/2024 | Liu | B25F 3/00 |

* cited by examiner

OPTICAL WATER CURTAIN SYSTEM ADAPTIVE TO WATER SPEED

TECHNICAL FIELD

The present disclosure relates to the technical field of optical water curtains, and in particularly, to an optical water curtain system adaptive to water speed.

BACKGROUND

The water curtain system commonly found on the market usually pumps water to a high place and then allows the water to fall in the form of many separate streams, thus producing a water curtain. At the same time, in order to improve the dynamic effect of the water curtain, and enhance the ornamentality of the water curtain at night, the water flow of the water curtain is often adjusted through a motor, such that the water flow can be continuously changed at a preset frequency, and then an LED light output is controlled based on a correspondence between the frequency of the change of the water flow and the frequency of a PWM signal for the LED light, such that various illusion effects of the water, such as flowing downstream, upstream, or being suspended and still, can be observed by the naked eye.

However, this approach needs to control the water flow through the motor to adapt to different lighting effects. Providing the motor will not only increase the complexity of the electronic control and structure, but also consume power during the motor operation and require the maintenance of the motor resulting in a high cost of use. There is thus a need for a simple optical water curtain system with low cost and good effect.

SUMMARY

The present disclosure is directed to an optical water curtain system adaptive to water speed, which can simplify the structure and reduce the manufacturing and use costs.

An optical water curtain system adaptive to water speed may include a water supply portion and at least one water collecting portion. It may further include a physical rotor, a control module, and an LED light-emitting module and a rotation speed detecting module electrically connected to the control module. The water supply portion is in fluid communication with the water collecting portion, and one side of the water collecting portion is provided with a number of outlets, water from the water supply portion flows down through the outlets of the water collecting portion to form a water curtain. The LED light-emitting module may be provided at the side of the water collecting portion where the outlets are located, and may emit light to illuminate the water curtain. The physical rotor may be located within the water curtain and rotatable under an impulse of a water flow from the water curtain. The rotation speed detecting module may be configured to detect a rotation speed of the physical rotor and send data to the control module. The control module may be configured to adjust a frequency of a PWM signal driving the LED light-emitting module to switch a light-emitting effect of the LED light-emitting module according to the rotation speed of the physical rotor.

In some embodiments, each outlet is provided with a nozzle, and the water in the water collecting portion is sprayed through the nozzles to form the water curtain.

In some embodiments, the LED light-emitting module comprises a plurality of LED light emitters, each of which is electrically connected to the control module.

In some embodiments, the rotation speed detecting module comprises a rotation speed detecting circuit, and the rotation speed detecting circuit comprises a rotation speed detecting sensor configured for detecting the rotation speed of the physical rotor.

In some embodiments, the physical rotor is provided with a magnet, the rotation speed detecting sensor is a Hall sensor, and the Hall sensor senses a change in a magnetic field of the magnet with rotation of the physical rotor to thereby obtain the rotation speed of the physical rotor.

In some embodiments, the rotation speed detecting sensor is a laser velocimetry sensor configured for detecting a frequency of reflection of a laser signal emitted from the laser velocimetry sensor to the physical rotor, to thereby obtain the rotation speed of the physical rotor.

In some embodiments, the physical rotor is provided with a reflective sheet configured to enhance a reflective intensity of the laser signal.

In some embodiments, the optical water curtain system may further include a reservoir configured to recycle water falling through the outlets from the water curtain.

In some embodiments, the optical water curtain system may further include a pump, one end of the pump is in communication with the water supply portion and another end is in communication with the water collecting portion through a drain pipe, and the drain pipe is provided with a solenoid valve electrically connected to the control module.

The beneficial effect of the present disclosure is as follows.

The present disclosure provides an optical water curtain system adaptive to water speed. The physical rotor is provided to adaptively rotate at different speeds and frequencies under the impulse of the water flow from the water curtain, the rotation speed detecting module is provided to detect the rotation speed of the physical rotor, and then a PWM signal having a frequency matching the rotation speed of the physical rotor is output to drive the LED light-emitting module according to the real-time rotation speed, realizing the water-speed-adaptive switching of the light-emitting effect of the LED light-emitting module. Various effects of the water of the optical water curtain such as flowing downstream, flowing upstream and being suspended and still can be observed by the naked eye, while the issue of the device complexity and high energy consumption due to the provision of the motor, which would lead to a high cost, can be addressed.

REFERENCE NUMERALS

1, water supply portion; 2, water collecting portion; 3, physical rotor; 4, control module; 5, LED light-emitting module; 6, rotation speed detecting module; 7, water curtain; 8, reservoir; 9, pump; 10, drain pipe; 11, solenoid valve.

DESCRIPTION OF EMBODIMENTS

The technical solutions in the embodiments of the present disclosure will be described clearly and completely in the following in combination with the figures. It is obvious that the described embodiments are only a part of the embodiments according to the present disclosure and not all of the embodiments. Based on the embodiments of the present disclosure, all the other embodiments obtained by people of ordinary skill in the field without inventive efforts fall within the scope of the present disclosure.

Embodiment 1

Figure 1:
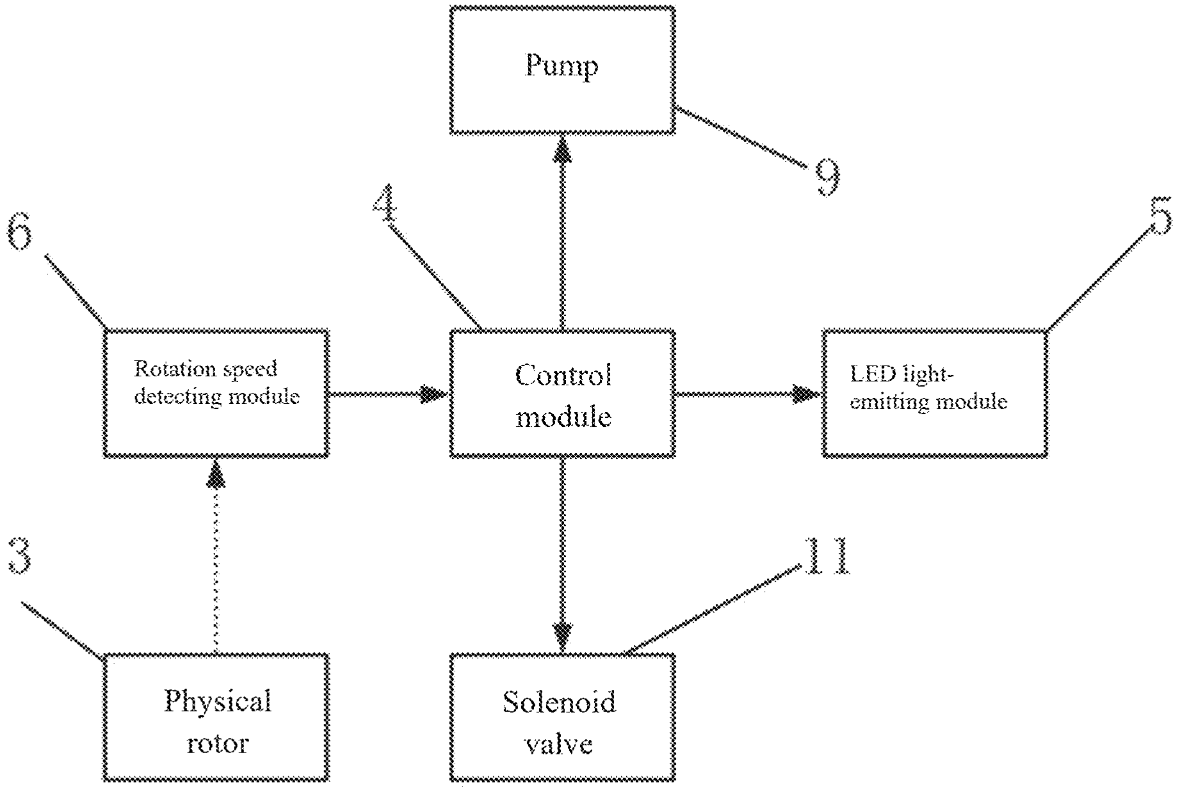
FIG. 1 shows a schematic diagram of a principle for an optical water curtain system adaptive to water speed provided by the present disclosure.
Figure 2:
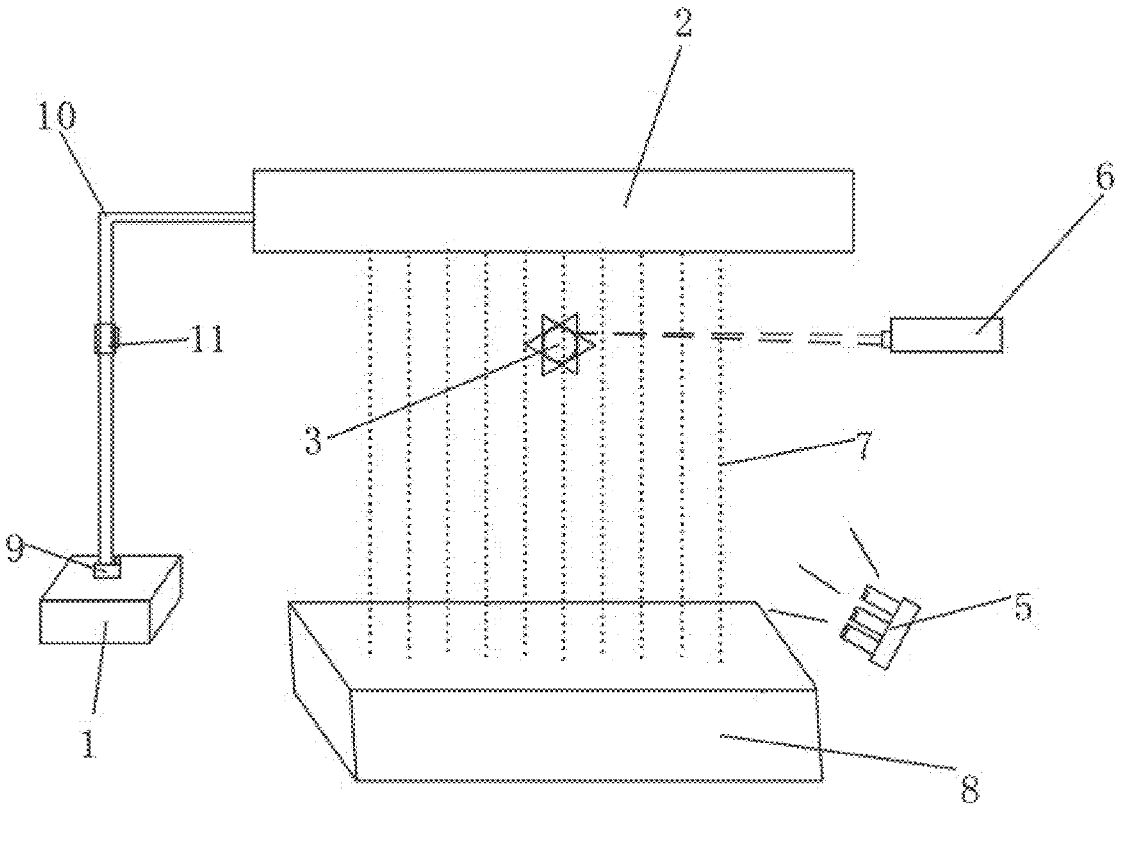
FIG. 2 shows a schematic diagram of a structure of an optical water curtain system adaptive to water speed provided by the present disclosure.

Referring to FIGS. 1 and 2, an optical water curtain system adaptive to water speed includes a water supply portion 1 and at least one water collecting portion 2. It further includes a physical rotor 3, a control module 4, and an LED light-emitting module 5 and a rotation speed detecting module 6 electrically connected to the control module 4.

Specifically, the water supply portion 1 is in fluid communication with the water collecting portion 2, and the water collecting portion 2 is provided with a number of outlets on one side, and water from the water supply portion 1 flows down through the outlets on the water collecting portion 2 to form a water curtain 7. The outlets are linearly arrayed on one side of the water collecting portion 2, and due to gravity, the water from the water supply portion 1 flows down through the outlets on the water collecting portion 2 and forms the water curtain along the outlets.

A nozzle is provided at each of the outlets, and the water in the water collecting portion 2 is sprayed through the multiple nozzles to form the water curtain. The formation of the water curtain can be further enhanced by providing the nozzles to spray the water flow, forming a more delicate and dense water curtain effect.

The LED light-emitting module 5 is provided on the side of the water collecting portion 2 where the outlets are located, and the light emitted from the LED light-emitting module 5 irradiates the water curtain. The LED light-emitting module 5 comprises a number of LED light emitters, each of which is electrically connected to the control module 4.

By irradiating the light emitted from the LED light emitters onto the water curtain, a beautiful optical effect will appear on the water flow due to the refraction and scattering effect of the light, thus forming the visual effect of the optical water curtain. Further, the frequency of a PWM signal driving the LED light-emitting module 5 can be adjusted by the control module 4, which can change the flashing frequency of the LED light emitter or the change rate of the brightness, so as to change the light and shadow effect presented on the optical water curtain. In practice, by setting the frequency of the output PWM signal, various effects of the water of the optical water curtain such as flowing downstream, flowing upstream and being suspended and still can be observed by the naked eye.

The physical rotor 3 is located inside the water curtain and rotates under the impulse of the water flow of the water curtain 7. The physical rotor 3 does not require complex mounting and driving structures, nor does it require electrical power to drive it, which makes it inexpensive. When the water flow from the water curtain 7 rushes towards the physical rotor 3, the physical rotor 3 rotates under the impulse of the water flow, and the speed of the water flow is in a proportional relationship with the rotation speed of the physical rotor 3, and at the same time, the rotation speed of the physical rotor 3 is in a proportional relationship with the frequency of change in the size of the water flow.

The rotation speed detecting module 6 is configured to detect the rotation speed of the physical rotor 3 and send the detected speed data to the control module 4. The control module 4 is configured to adjust the frequency of the PWM signal driving the LED light-emitting module 5 according to the rotation speed of the physical rotor 3, and to switch the light-emitting effect of the LED light-emitting module 5. In this embodiment, a number of correspondences between the rotation speed of the physical rotor 3 and the frequency of the PWM signal are pre-stored in the control module 4. Upon receiving the real-time rotation speed of the physical rotor 3 detected by the rotation speed detecting module 6, according to the pre-stored correspondences between the rotation speed of the physical rotor 3 and the frequency of the PWM signal, the control module 4 outputs a PWM signal having a frequency corresponding to that real-time rotation speed to drive the LED light-emitting module 5 to switch into the corresponding lighting effect, thus achieving the change of the light and shadow effect of the optical water curtain.

The rotation speed detecting module 6 includes a rotation speed detecting circuit, which includes a rotation speed detecting sensor for detecting the rotation speed of the physical rotor 3.

Specifically, the physical rotor 3 is provided with a magnet, and the rotation speed detecting sensor is a Hall sensor. The Hall sensor senses the change in the magnetic field of the magnet with the rotation of the physical rotor, and thus obtains the rotation speed of the physical rotor. The Hall sensor can provide a fast response time and high detection accuracy. The magnet periodically approaches the Hall sensor as it rotates with the rotation of the physical rotor 3. The Hall sensor senses the change in the magnetic field of the magnet as it rotates with the physical rotor 3 and outputs a corresponding electrical signal. Based on the electrical signal output by the Hall sensor, the number of revolutions of the physical rotor 3 is determined, and thus the rotation speed of the physical rotor 3 is obtained.

Preferably, the optical water curtain system further includes a reservoir 8, the reservoir 8 is used to recycle the water from the water curtain 7 falling through the outlets, such that recycling of water resources can be realized. Buffering and deceleration of the water flow when it falls into the reservoir 8 can reduce the noise generated by the impulse of the water flow, and reduce the impact of the operation of the system on the surrounding environment.

The optical water curtain system further includes a pump 9 electrically connected to the control module 5, one end of the pump 9 being connected to the water supply portion 1, and the other end being connected to the water collecting portion 2 through a drain pipe 10. The drain pipe 10 is provided with a solenoid valve 11 electrically connected to the control module 5. The control module 5 controls opening and closing of the solenoid valve 11, thereby controlling the starting and stopping of the water supply of the water supply portion 1 to the water collecting portion 2. It is also possible to control the size and rhythm of the water flowing into the flow collecting portion 2 by controlling a degree of the opening and closing of the solenoid valve 11.

Embodiment 2

Embodiment 2 provides an adaptive optical water curtain system having the same structure as that of Embodiment 1, with the difference that the rotation speed detecting sensor is a laser velocimetry sensor. The laser velocimetry sensor is used to detect the frequency of reflection of a laser signal emitted from the laser velocimetry sensor to the physical rotor 3, and thus to obtain the rotation speed of the physical rotor 3. The laser velocimetry sensor emits a laser signal to a surface of the physical rotor 3, the surface of the physical rotor reflects the laser signal and the reflected laser signal is received by the laser velocimetry sensor. The laser velocimetry sensor obtains rotation speed information of the physical rotor 3 based on the change in the frequency of receiving the laser signal.

The physical rotor 3 is provided with a reflective sheet used to enhance the reflective strength of the laser signal. The reflective sheet is able to enhance the reflective strength of the laser signal, making the laser signal reflected by the physical rotor 3 more stable and less susceptible to light changes in external environments or other interferences, thus improving the accuracy of rotation speed detection.

The present disclosure provides an optical water curtain system adaptive to water speed. The physical rotor 3 is adopted which rotates under the impulse of the water curtain 7, so as to feedback the size and change frequency of the water flow of the water curtain 7; and then the rotation speed of the physical rotor 3 is detected in order to control the switching of the LED light-emitting module's light-emitting effect. There is no need to provide a motor to control the water flow, the structure is simple, and the manufacturing and use costs are low.

The above are only the preferred embodiments of this disclosure, and should not be construed to limit the protection scope of this disclosure. Any modifications, equivalent replacements and improvements made within the principles of the present disclosure should be included within the protection scope of the present disclosure.

The invention claimed is:

1. An optical water curtain system adaptive to water speed, comprising a water supply portion and at least one water collecting portion; wherein the optical water curtain system further comprises a physical rotor, a control module, and an LED light-emitting module and a rotation speed detecting module electrically connected to the control module;

wherein the water supply portion is in fluid communication with the water collecting portion, and one side of the water collecting portion is provided with a number of outlets, water from the water supply portion flows down through the number of outlets of the water collecting portion to form a water curtain; the LED light-emitting module is provided at the side of the water collecting portion where the number of outlets are located, and emits light to illuminate the water curtain; the physical rotor is located within the water curtain and is rotatable under an impulse of a water flow from the water curtain;

wherein the rotation speed detecting module is configured to detect a rotation speed of the physical rotor and send data to the control module;

wherein the control module is configured to adjust a frequency of a PWM signal driving the LED light-emitting module to switch a light-emitting effect of the LED light-emitting module according to the rotation speed of the physical rotor;

wherein the rotation speed detecting module comprises a rotation speed detecting circuit, and the rotation speed detecting circuit comprises a rotation speed detecting sensor configured for detecting the rotation speed of the physical rotor; and wherein the rotation speed detecting sensor is a laser velocimetry sensor configured for detecting a frequency of reflection of a laser signal emitted from the laser velocimetry sensor to the physical rotor, to thereby obtain the rotation speed of the physical rotor.

2. The optical water curtain system adaptive to water speed according to claim 1, wherein each outlet is provided with a nozzle, and the water in the water collecting portion is sprayed through the nozzles to form the water curtain.

3. The optical water curtain system adaptive to water speed according to claim 1, wherein the LED light-emitting module comprises a plurality of LED light emitters, each of which is electrically connected to the control module.

4. The optical water curtain system adaptive to water speed according to claim 1, wherein the physical rotor is provided with a magnet, the rotation speed detecting sensor is a Hall sensor, and the Hall sensor senses a change in a magnetic field of the magnet with rotation of the physical rotor to thereby obtain the rotation speed of the physical rotor.

5. The optical water curtain system adaptive to water speed according to claim 1, wherein the physical rotor is provided with a reflective sheet configured to enhance a reflective intensity of the laser signal.

6. The optical water curtain system adaptive to water speed according to claim 1, further comprising a reservoir configured to recycle water falling through the number of outlets from the water curtain.

7. The optical water curtain system adaptive to water speed according to claim 1, further comprising a pump; wherein one end of the pump is in communication with the water supply portion and another end is in communication with the water collecting portion through a drain pipe, and the drain pipe is provided with a solenoid valve electrically connected to the control module.

* * * * *